(12) United States Patent
Kanagawa (10) Patent No.: US 10,041,530 B2
(45) Date of Patent: Aug. 7, 2018

(54) DUST COVER FOR BALL JOINT (71) Applicant: NOK CORPORATION, Tokyo (JP)

(72) Inventor: Koji Kanagawa, Makinohara (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 15/307,293

(22) PCT Filed: May 8, 2015

(86) PCT No.: PCT/JP2015/063255
§ 371 (c)(1),
(2) Date: Oct. 27, 2016

(87) PCT Pub. No.: WO2015/174329
PCT Pub. Date: Nov. 19, 2015

(65) Prior Publication Data
US 2017/0051784 A1    Feb. 23, 2017

(30) Foreign Application Priority Data
May 13, 2014   (JP) .................................. 2014-099488

(51) Int. Cl.
F16C 11/06    (2006.01)
F16J 15/52    (2006.01)
F16C 41/04    (2006.01)

(52) U.S. Cl.
CPC .......... F16C 11/0671 (2013.01); F16C 11/06 (2013.01); F16C 41/04 (2013.01); F16J 15/52 (2013.01)

(58) Field of Classification Search
CPC ... F16C 11/0666; F16C 11/0671; F16C 11/06; F16C 41/04; F16J 15/52
See application file for complete search history.

(56) References Cited

U.S. PATENT DOCUMENTS 3,021,157 A * 2/1962 Moskovitz ............. B60G 7/005
403/134
3,175,834 A * 3/1965 Wallace ................. B60G 7/005
277/635
(Continued)

FOREIGN PATENT DOCUMENTS

FR    1340098 A    10/1963
JP    S50-098169 U    8/1975
(Continued)

OTHER PUBLICATIONS

Extended European Search Report for Application No. EP 15 79 3601 dated Mar. 2, 2017 (6 pages).

*Primary Examiner* — Eugene G Byrd
(74) *Attorney, Agent, or Firm* — Harness, Dickey & Peirce, P.L.C.

(57) ABSTRACT

A dust cover for a ball joint has a spherical head portion, a shaft, a cylindrical one-end large-diameter opening portion, a large-diameter opening portion side reinforcing ring fixed to a socket, the other end small-diameter opening portion retained onto the shaft, a flange portion extending from an end portion in the other-end small-diameter opening portion of the one-end large-diameter opening portion toward a ball stud side, and a rubber-like elastic film portion coupling an inward end portion of the flange portion and the other-end small-diameter opening portion. The dust cover has an outside projection provided on an outer peripheral surface of the film portion, and an inside projection provided on an inner peripheral surface of a joint portion between the flange portion and the film portion, and the outside projection and the inside projection come into contact with each other when the dust covers for the ball joint are laminated.

2 Claims, 8 Drawing Sheets

(56) References Cited

U.S. PATENT DOCUMENTS

| | | | | |
|---|---|---|---|---|
| 3,208,290 | A * | 9/1965 | Mathues | F16C 11/0671 277/635 |
| 3,248,955 | A * | 5/1966 | Templeton | B60G 7/005 277/635 |
| 4,304,416 | A * | 12/1981 | Oshima | F16D 65/18 277/561 |
| 4,650,362 | A * | 3/1987 | Kubo | F16C 11/0671 277/590 |
| 4,856,795 | A * | 8/1989 | DeLano | B29C 43/18 277/635 |
| 5,466,084 | A * | 11/1995 | Brueggen | F16C 11/0671 277/635 |
| 5,538,275 | A * | 7/1996 | Lomnick | B60G 7/005 277/635 |
| 6,298,955 | B1 * | 10/2001 | Frost | F16J 3/042 188/72.9 |
| 7,670,078 | B2 * | 3/2010 | Elterman | F16C 11/0671 277/635 |
| 8,393,624 | B2 * | 3/2013 | Hoets | F16D 3/845 277/634 |
| 9,206,837 | B2 * | 12/2015 | Ishimori | F16C 11/06 |
| 9,221,225 | B2 * | 12/2015 | Idies | F16C 11/06 |
| 9,528,547 | B2 * | 12/2016 | Hosen | F16J 3/042 |
| 2003/0156896 | A1 * | 8/2003 | Suzuki | B60G 7/005 403/134 |
| 2004/0028302 | A1 * | 2/2004 | Abels | F16C 11/0671 384/206 |
| 2011/0089644 | A1 * | 4/2011 | Hoets | F16D 3/845 277/634 |

FOREIGN PATENT DOCUMENTS

| | | |
|---|---|---|
| JP | S50-117255 U | 9/1975 |
| JP | S54-058557 U | 4/1979 |
| JP | S60-054867 U | 4/1985 |
| JP | S60-054868 U | 4/1985 |
| JP | S62-137408 A | 6/1987 |
| JP | S63-032465 | 8/1988 |
| JP | H02-116021 U | 9/1990 |
| JP | H02-143518 U | 12/1990 |
| JP | H04-034564 U | 3/1992 |
| JP | H05-019633 U | 3/1993 |
| JP | H06-024225 U | 3/1994 |

* cited by examiner

DUST COVER FOR BALL JOINT

CROSS-REFERENCE TO RELATED APPLICATIONS

This application is a U.S. National Stage Application of International Application No. PCT/JP2015/063255, filed on May 8, 2015, and published in Japanese as WO 2015/174329 A1 on Nov. 19, 2015. This application claims priority to Japanese Application No. 2014-099488, filed on May 13, 2014. The entire disclosures of the above applications are incorporated herein by reference.

BACKGROUND OF THE INVENTION

Field of the Invention

The present invention relates to a dust cover for a ball joint.

Further, the present invention relates to a dust cover for a ball joint which is used in an automobile suspension device, and a steering device.

Description of the Conventional Art

Figure 7:
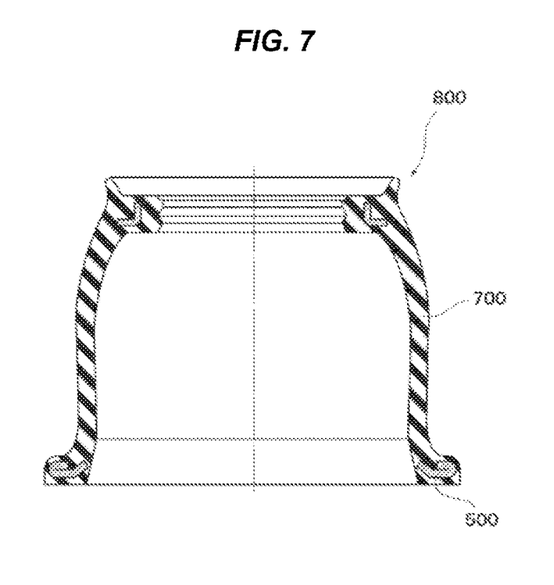
FIG. 7 is a vertical cross sectional view of a dust cover for a ball joint according to a prior art.

Conventionally, as a ball joint to which a dust cover is installed for the purpose of a dust prevention and a water prevention in a ball joint coupling portion, there has been known a dust cover for a ball joint which is described in FIG. 7.

Figure 8:
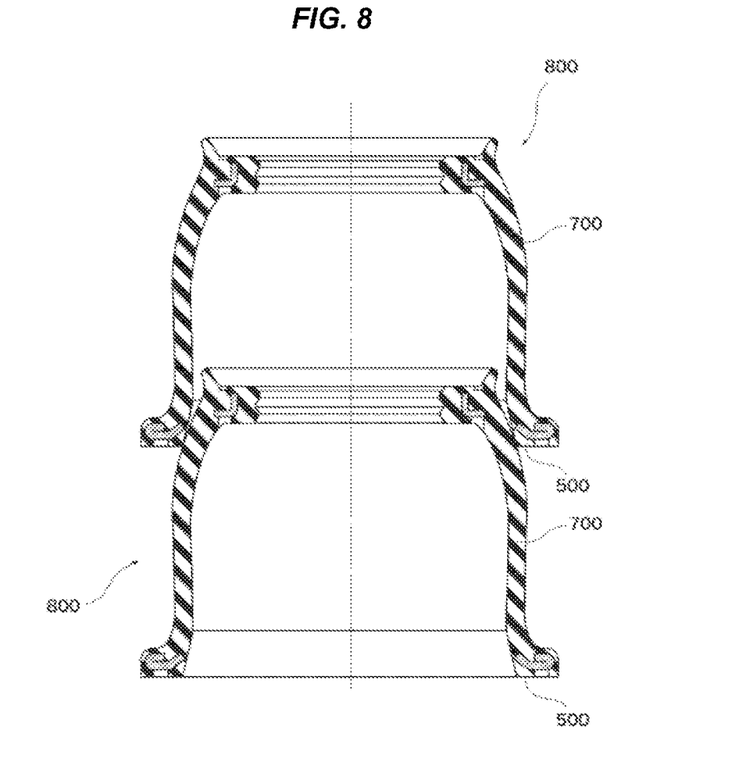
FIG. 8 is a vertical cross sectional view of a state in which the dust covers shown in FIG. 7 are laminated.

Since this kind of dust cover 800 for a ball joint is of a type that an inner peripheral surface of a one-end large-diameter opening portion 500 is fitted to an outer peripheral surface of a socket, film portions 700 are not in contact with each other as shown in FIG. 8 even if the dust covers 800 are laminated.

Figure 9:
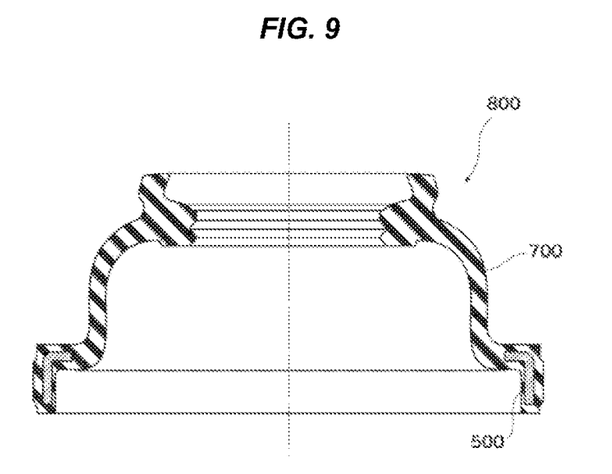
FIG. 9 is a vertical cross sectional view of the dust cover for the ball joint according to the prior art.
Figure 10:
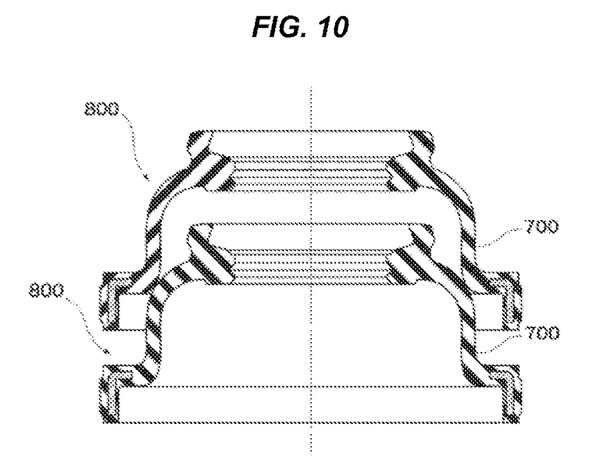
FIG. 10 is a vertical cross sectional view of a state in which the dust covers shown in FIG. 9 are laminated.

However, in a dust cover 800 of a type that an outer periphery of a one-end large-diameter opening portion 500 is fitted to an inner peripheral surface of a socket, as shown in FIG. 9, film portions 700 thereof are in contact with each other in the case that the dust covers 800 are laminated. As shown in FIG. 10.

As a result, there has been brought about a problem that the film portions 700 are stuck to each other, whereby not only it takes a lot of trouble with a peeling work but also the film portions 700 are damaged, if the state mentioned above is left for a long time due to a conveying work.

Figure 11:
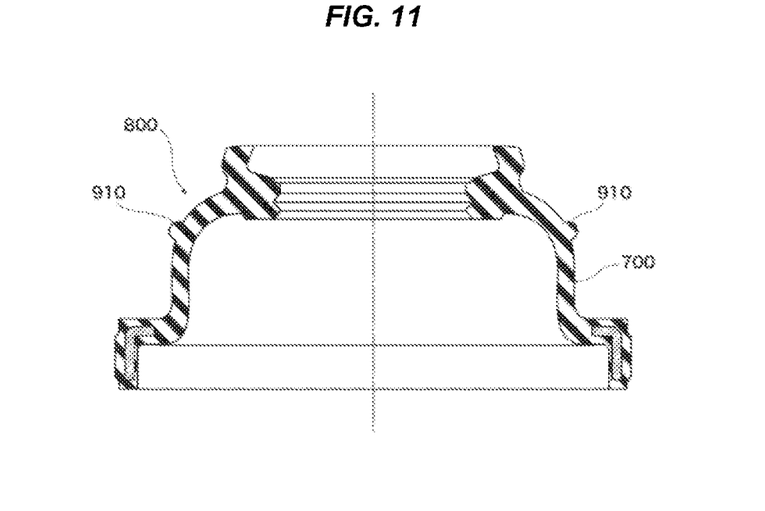
FIG. 11 is a vertical cross sectional view of a dust cover for a ball joint according to a prior art obtained by partly improving the dust cover in FIG. 9.

Consequently, there has been proposed a countermeasure for avoiding the contact between the film portions 700 by forming a plurality of outer peripheral projections 910 on an outer peripheral surface of the film portion 700 of the dust cover 800 as shown in FIG. 11.

Figure 12:
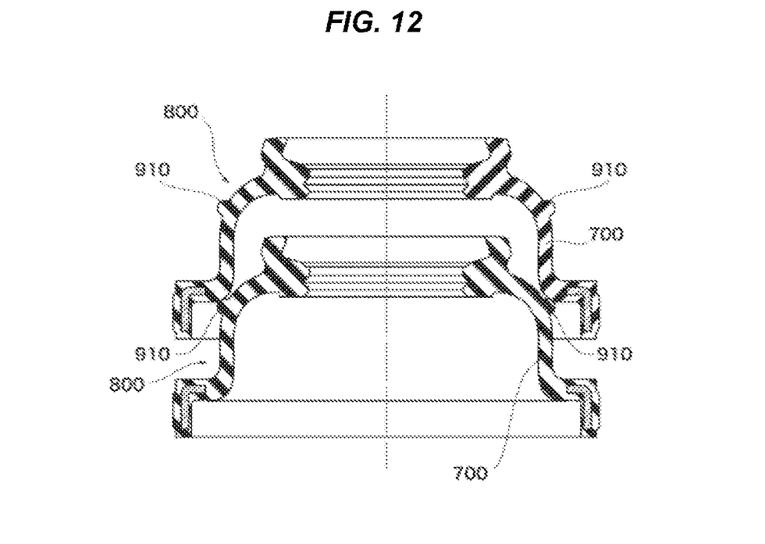
FIG. 12 is a vertical cross sectional view of a state in which the dust covers shown in FIG. 11 are laminated.
Figure 13:
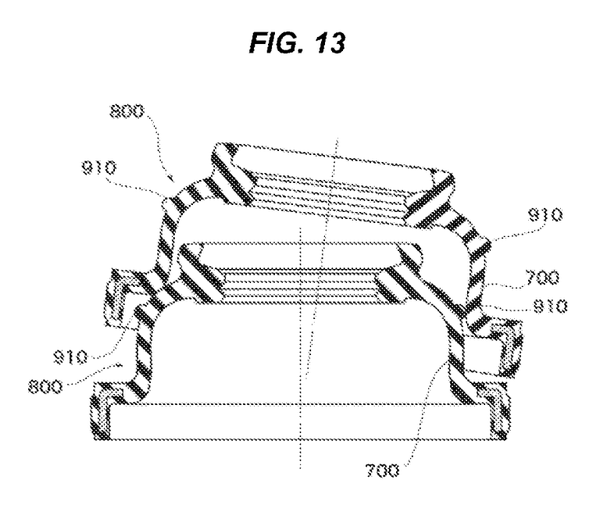
FIG. 13 is a view showing a trouble occurred in the dust cover shown in FIG. 12.

In the case of laminating correctly, it is possible to avoid the contact between the film portions 700 as shown in FIG. 12, however, there has been brought about a problem that the dust covers 800 are deviated as shown in FIG. 13 and the film portions 700 are in contact with each other due to vibration during the conveyance and failing at the laminating time.

SUMMARY OF THE INVENTION

Problem to be Solved by the Invention

The present invention is made by taking the problems mentioned above into consideration, and an object of the present invention is to provide a dust cover for a ball joint in which film portions are not in contact with each other even if the dust covers are laminated, in the dust cover of a type that an outer periphery of a one-end large-diameter opening portion is fitted to an inner peripheral surface of a socket.

Means for Solving the Problem

A dust cover for a ball joint according to the present invention is a dust cover for a ball joint comprising:
a spherical head portion formed in one end of a ball stud, the spherical head portion being retained within a socket;
a shaft in the other end of the ball stud, the shaft being fastened and fixed to a knuckle;
a cylindrical one-end large-diameter opening portion being fixed and retained to an inner peripheral surface of the socket;
a large-diameter opening portion side reinforcing ring being buried in the one-end large-diameter opening portion;
the other end small-diameter opening portion being retained onto an outer peripheral surface of the shaft;
a flange portion extending from an end portion in the other-end small-diameter opening portion of the one-end large-diameter opening portion toward the ball stud side; and
a film portion coupling an inward end portion of the flange portion and the other-end small-diameter opening portion and made of a rubber-like elastic material,
wherein the dust cover further comprises an outside projection which is provided on an outer peripheral surface of the film portion, and an inside projection which is provided on an inner peripheral surface of a joint portion between the flange portion and the film portion, and the outside projection and the inside projection come into contact with each other when the dust covers for the ball joint are laminated.

Effect of the Invention

The present invention achieves effects described below.

According to the dust cover for the ball joint of the invention described in the first aspect of the current disclosure, the dust cover is provided with the outside projection which is provided on the outer peripheral surface of the film portion, and the inside projection which is provided on the inner peripheral surface of the joint portion between the flange portion and the film portion, and is structured such that the outside projection and the inside projection come into contact with each other when the dust covers are laminated. As a result, it is possible to effectively avoid the contact between the film portions even if the dust covers are laminated.

Further, according to a dust cover for a ball joint of the invention described in the second aspect of the current disclosure, the outside projection is constructed by a plurality of projections which are arranged at even intervals circumferentially, and the inside projection is constructed by an annular projection. As a result, deformation of the film portion is not adversely affected, and it is possible to effectively avoid the contact between the film portions even if the dust covers are laminated.

Further, according to a dust cover for a ball joint of the invention described in the third aspect of the current disclosure, the inside projection is constructed by a plurality of projections which are arranged at even intervals circumferentially, and the outside projection is constructed by an annular projection. As a result, it is easy to form, and it is possible to effectively avoid the contact between the film portions even if the dust covers are laminated.

DETAILED DESCRIPTION OF PREFERRED EMBODIMENTS

A description will be given of modes for carrying out the present invention.

As shown in FIGS. 1, 2, 3, 4 and 5, a dust cover 8 for a ball joint according to the present invention is used in the ball joint in which a spherical head portion 2 formed in one end of a ball stud 1 is retained within a socket 3, and a shaft 4 in the other end of the ball stud 1 is fastened and fixed to a knuckle 10.

Further, the dust cover 8 is structured such that a cylindrical one-end large-diameter opening portion 5 is fixed and retained to an inner peripheral surface of an annular groove 31 which is formed in the socket 3, and the other end-small-diameter opening portion 6 is retained to a groove 11 which is formed in an outer peripheral surface of a knuckle 10 retained onto an outer peripheral surface of the shaft 4. A large-diameter opening side metal reinforcing ring 81 having an approximately L-shaped form in its cross section is embedded in the cylindrical one-end large-diameter opening portion 5.

Further, the dust cover 8 is provided with a basic structure constructed by a flange portion 51 and a film portion 7. The flange portion 51 extends from an end portion in the other-end small-diameter opening portion 6 side of the one-end large-diameter opening portion 5 toward the ball stud 1 side. The film portion 7 is constructed by a cylindrical portion 7a which connects an inward end portion of the flange portion 51 and the other-end small-diameter opening portion 6 and extends from an inner end in a diametrical direction of the flange portion 51 toward the other-end small-diameter opening portion 6, and a tapered portion 7b which extends from the cylindrical portion toward the other-end small-diameter opening portion 6, (is formed into a drum shape) and is made of a rubber-like elastic material.

Further, outside projections 91 which are formed at even intervals circumferentially are formed on an outer peripheral surface of the film portion 7.

Further, an annular inside projection 92 is provided on an inner peripheral surface of a joint portion 71 between the flange portion 51 and the film portion 7.

Figure 1:
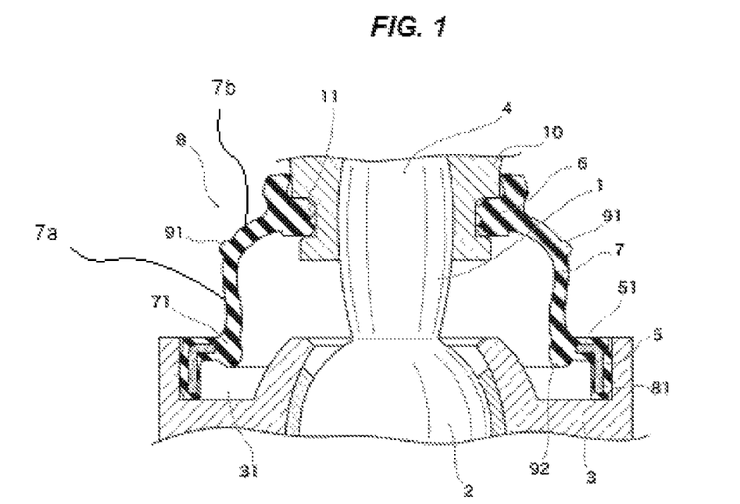
FIG. 1 is a vertical cross sectional view of a dust cover for a ball joint according to the present invention.
Figure 2:
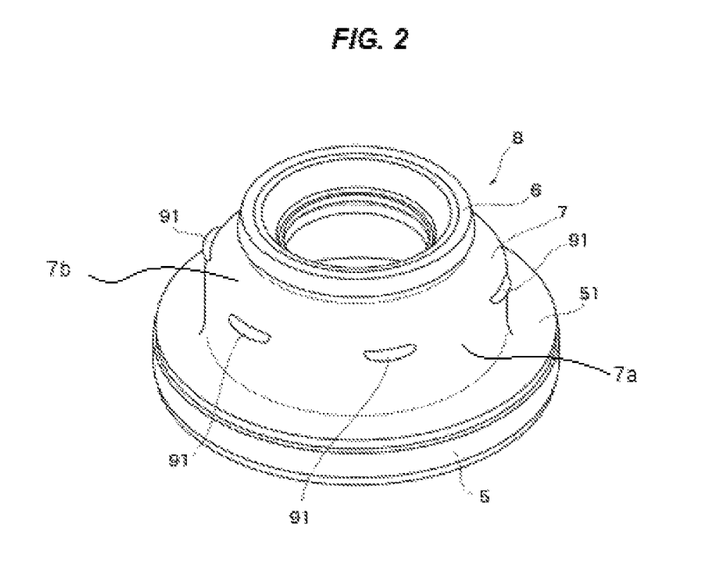
FIG. 2 is a perspective view before installation of the dust cover shown in FIG. 1.
Figure 3:
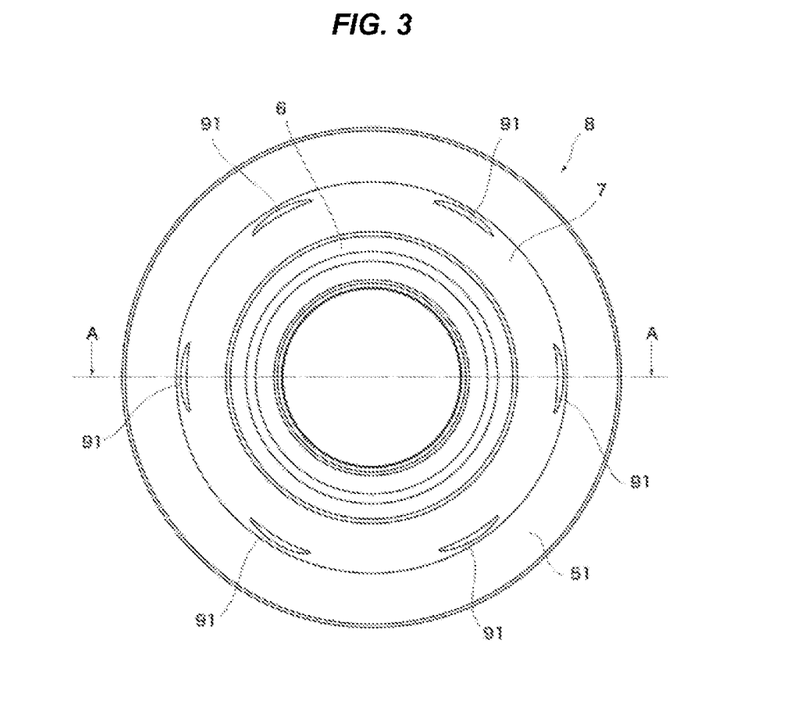
FIG. 3 is a plan view before installation of the dust cover shown in FIG. 1.
Figure 4:
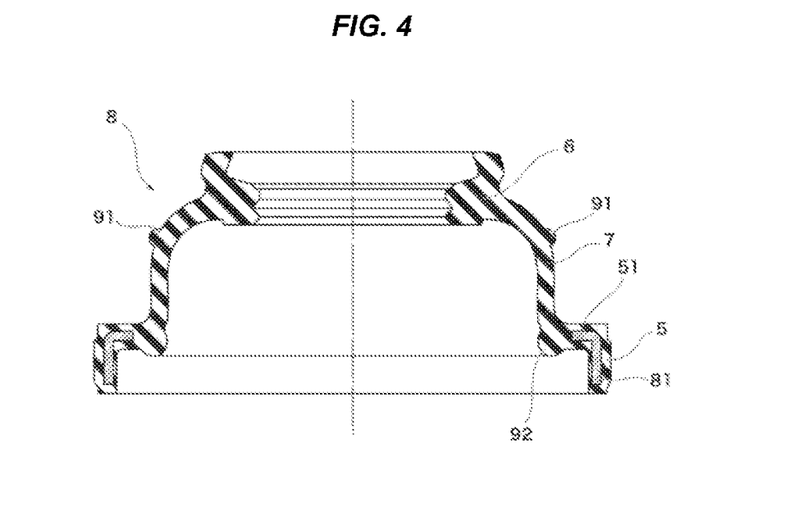
FIG. 4 is a cross sectional view along a line A-A in FIG. 3.
Figure 5:
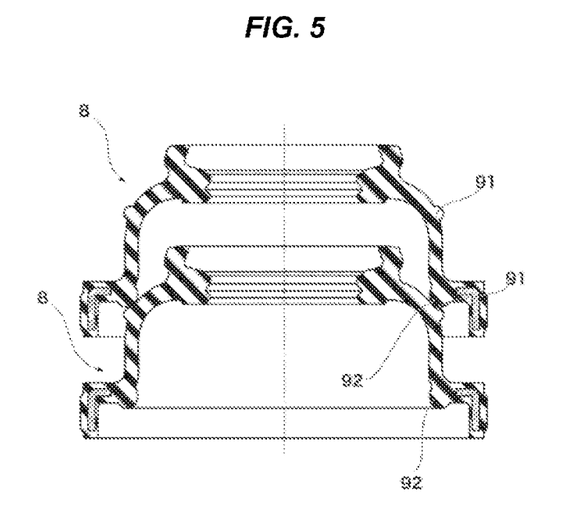
FIG. 5 is a vertical cross sectional view of a state in which the dust covers shown in FIG. 4 are laminated.

Further, in the case that this kind of dust covers 8 for the ball joint are laminated as shown in FIG. 5, the outside projections 91 and the inside projection 92 come into contact with each other.

As a result, it is possible to effectively avoid the contact between the film portions 7 even in the case that the dust covers 8 are laminated.

Particularly even in the case that vibrations are generated during the transfer or some failings are generated at the laminating time, it is securely possible to effectively avoid the contact between the film portions 7.

As shown in FIGS. 1, 2, 3, 4 and 5, the present embodiment is designed such that the outside projections 91 are constructed by a plurality of projections which are arranged at even intervals circumferentially, and the inside projection 92 is constructed by one annular projection.

As a result, deformation of the film portion 7 is not adversely affected.

A plurality of outside projections 91 may exist, however, three or more, that is, four to eight outside projections are preferably arranged at even intervals.

Figure 6:
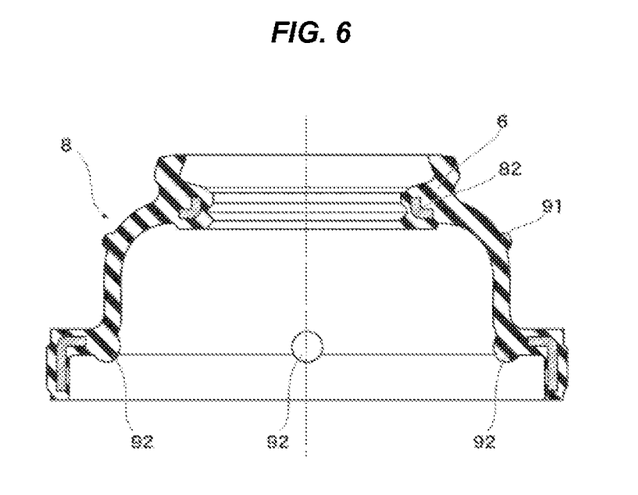
FIG. 6 is a view showing a dust cover indicating the other embodiment according to the present invention in the same manner as FIG. 4.

Next, a description will be given of a dust cover 8 for a ball joint according to the other embodiment of the present invention with reference to FIG. 6.

A different point from the previously described embodiment exists in a point that the inside projection 92 is constructed by a plurality of projections which are arranged at even intervals circumferentially, and the outside projections 91 are constructed by an annular projection.

Further, a small-diameter opening portion side reinforcing ring 82 having an L-shaped cross sectional form is embedded in the other-end small-diameter opening portion 6.

As a result, an inner mold at the molding time can be easily taken out and it is easy to mold.

In the embodiments described above, any one of the outside projection 91 and the inside projection 92 is constructed by the annular projection, and the other is constructed by a plurality of projections which are arranged at even intervals circumferentially, however, both of them may be constructed by the annular projection.

However, in the case that both of them are constructed by a plurality of projections which are arranged at even intervals circumferentially, the possibility that the projections do not come into contact with each other occurs. Therefore, this case is not preferable.

Further, a metal material and a resin material are appropriately selected and employed as a material of the large-diameter opening portion side reinforcing ring 81 and the small-diameter opening portion side reinforcing ring 82.

Further, a material of the dust cover 8 is selected and used in conformity to an intended use, from a rubber-like elastic material such as chloroprene, a polyester elastomer, and a thermoplastic elastomer such as a thermoplastic polyurethane.

Further, grease is sealed into the dust cover 8.

Further, it goes without saying that the present invention is not limited to the best mode for carrying out the invention mentioned above, but can employ various structures without deflecting from the scope of the present invention.

INDUSTRIAL APPLICABILITY

The present invention can be used in a ball joint which is used in a suspension device and a steering device of an automobile.

The invention claimed is:

1. A dust cover for a ball joint that includes a ball stud having a spherical head portion that is retained within a socket and a shaft connected to the ball stud that is fastened and fixed to a knuckle, the dust cover comprising:
   a cylindrical one-end large-diameter opening portion that is configured to be fixed and retained to an inner peripheral surface of the socket;
   a large-diameter opening portion side reinforcing ring that is buried in the cylindrical one-end large-diameter opening portion;
   an other end small diameter opening portion;
   a flange portion extending from an end portion in the other-end small-diameter opening portion of the one-end large-diameter opening portion that extends toward the ball stud; and
   a film portion coupling an inward end portion of the flange portion and the other-end small-diameter opening portion and made of a rubber-like elastic material, the film portion including a cylindrical portion coupled at one end thereof to the inward end portion of the flange portion, and a tapered portion that tapers inward from another end of the cylindrical portion toward the other-end small-diameter opening portion and is coupled to the other-end small-diameter opening portion,
   wherein the dust cover further comprises an outside projection which is provided on an outer peripheral surface of the film portion at a first location which substantially defines a boundary between the cylindrical portion and the tapered portion, and an inside projection which is provided on an inner peripheral surface of the film portion at a second location which substantially defines a joint portion between the flange portion and the cylindrical portion of the film portion, and the outside projection of the dust cover is configured to contact the inside projection of another separate dust cover when the dust cover and the another separate dust cover are laminated.

2. The dust cover for the ball joint according to claim 1, wherein the outside projection is constructed by a plurality of projections which are arranged at even intervals circumferentially, and the inside projection is constructed by an annular projection.

* * * * *